United States Patent [19]
Tuli

[11] Patent Number: 5,870,072
[45] Date of Patent: *Feb. 9, 1999

[54] APPARATUS AND METHOD FOR PRODUCING A VIEWSCREEN FROM A MINIATURE HIGH RESOLUTION CHIP

[76] Inventor: Raja Singh Tuli, 1155 Rene Levesque (W) #3500, Montrea, QC, Canada, H3B 3T6

[ * ] Notice: The term of this patent shall not extend beyond the expiration date of Pat. No. 5,389,946.

[21] Appl. No.: 443,447

[22] Filed: May 18, 1995

[51] Int. Cl.$^6$ ....................................................... G09G 3/34
[52] U.S. Cl. ................................. 345/106; 345/7; 349/20; 349/21
[58] Field of Search ......................... 345/106, 55; 359/44, 359/43, 40; 348/770; 349/20, 19, 21; G09G 3/34

[56] References Cited

U.S. PATENT DOCUMENTS

| | | | |
|---|---|---|---|
| 3,637,291 | 1/1972 | Kessler et al. | 359/44 |
| 4,391,492 | 7/1983 | Lu et al. | 359/44 |
| 4,472,026 | 9/1984 | Boyd et al. | 359/44 |
| 5,140,447 | 8/1992 | Kaneko et al. | 359/43 |
| 5,389,946 | 2/1995 | Tuli | 345/106 |

*Primary Examiner*—Michael H. Lee

[57] ABSTRACT

A miniature single monolithic chip is to be used to create a viewscreen for Computers, Television or Video applications. Magnifying this display would produce an inexpensive screen capable of being mounted on face goggles, or alternate stand alone apparatus. Using an optic system, the eye could perceive an image of various size screens. The chip being so close to the eye would require very little illumination. Advantages of this apparatus are numerous especially due to low power consumption and light weight. Ideally this would be suitable for portable lap top Computer and Video systems. Dual chips could also be used to produce true Three Dimensional images capable of large screen viewing. The device can be back lit and projected onto large screens using transparent components. A heat sensitive coating on this chip changes appearance with temperature changes for each pixel on the display.

6 Claims, 8 Drawing Sheets

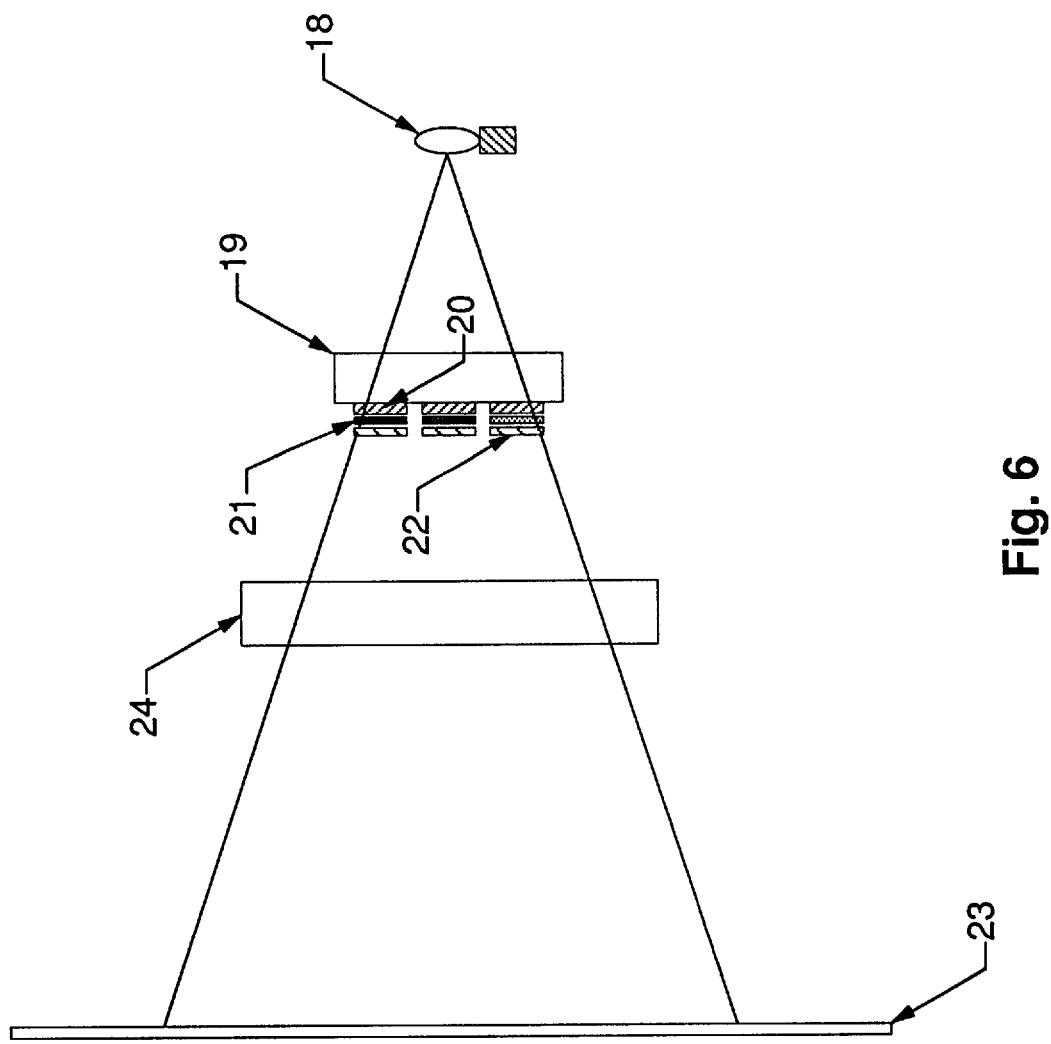

APPARATUS AND METHOD FOR PRODUCING A VIEWSCREEN FROM A MINIATURE HIGH RESOLUTION CHIP

BACKGROUND OF THE INVENTION

This invention relates to an apparatus and a method for producing a display device from a single miniature high resolution monolithic chip. In particular, the apparatus uses a chip with an array of heating elements in an orderly grid pattern with a thermochromic die coating which changes from its room temperature color to colorless, with a temperature increment to a specified temperature based on the thermal properties of the die. Viewed through a lens magnification system, this high resolution image could appear in sizes ranging from computer monitors to cinema screens.

Display screens of very high resolution have numerous applications, ideally suited for a variety of portable applications. The cost of this invention makes it quite feasible as a miniature display device compared to the cost of prior art, with additional advantages of low power consumption, compact design, and light weight.

SUMMARY OF THE INVENTION

Generally speaking, in accordance with the present invention, a viewscreen of high resolution and speed is provided with the use of a single monolithic chip. The apparatus configuration includes a lens system which magnifies an image produced by this custom chip for specific applications. The chip and lens assembly could all be mounted on face goggles or alternative apparatus enabling portability and projection type displays. The apparatus of the invention need not be magnified, as it can be produced in a large enough size and resolution to be viewed without the aid of a lens assembly.

The heart of the invention lies within the custom chip, being the most critical component. This chip is composed of an array of heating elements which can each be individually addressed in a matrix fashion. A special thermochromic die or liquid crystal coating on this array would permit each picture element or "pixel" to undergo a temporary color change from black or another opaque color to colorless upon applying heat. Thermochromic dies have the property of changing color when the temperature of the surface beneath them is brought above a specific temperature by increasing it. These heating elements and their surrounding areas have a specific thermal mass which allows the elements to maintain a higher temperature for one frame period of the displayed image, whereby the thermal mass acts as a memory for the frame period maintaining the die's transparent or opaque state. Some pixels can be heated for a lesser duration within each frame period to provide a much shorter color change than others producing a grey scale effect, whereby heat is used as a memory device for each pixel. In another embodiment of the invention, a supplementary heat storage element is deposited over each heating element to enable the heat supplied by these elements to be stored for a longer duration and slowly dissipated within one frame period, thus keeping those pixels active for that entire frame period or part of which, consequently increasing their life span and also allowing for rapid addressing of other elements within the matrix for the same frame period. The thermal mass in this particular embodiment is the supplementary heat storage element, heating element, die coatings and other components in the immediate vicinity of each pixel that are responsible for heat transfer and color changes. The supplementary heat storage element functions as a means to protect the heating elements and die coating from excessive exposures to high temperatures, and also provides a heat memory effect significantly reducing power requirements. By rapidly addressing this high density array producing rapid color changes, it is possible to create a view screen capable of creating a moving monochrome or color picture display. The human eye does not "see" moving objects, instead it perceives a series of different stationary images producing the effect of motion. As long as frames are displayed quickly enough to avoid significant flicker, the effect of motion will be successfully achieved.

It is possible to convert a monochrome display of the device to color by using a sequential color lighting technique, which uses three primary colored LEDs or other light sources that alternately change the color of each frame. Other means of producing a color display involve using groups of primary colored pads, which collectively form one pixel and reflect light off any combination to produce a color display. A back lit version can also be created which relies on groups of primary colored filters which collectively form one pixel, with the matrix of miniature or transparent heating elements deposited on a clear substrate, allowing light to travel through the device, with a projection option. All embodiments of the device can be produced and viewed without magnification, although magnification means may become necessary as size decreases.

Prior Art would involve U.S. Pat No. 5,389,946 to Raja Singh Tuli which discloses a similar display device that utilizes thermochromic liquid crystals which change from one color to another, whereas this present application involves a transition from an opaque color to transparent, and also introduces a supplementary heat storage element.

BRIEF DESCRIPTION OF DRAWINGS:

This invention may be better understood and its numerous objects and advantages will become apparent to those skilled in the art by reference to the accompanying drawings as follows:

FIG. 6 represents one embodiment of a back lit magnification assembly, in accordance with the present invention.

DETAILED DESCRIPTION OF PREFERRED EMBODIMENTS

Figure 1:
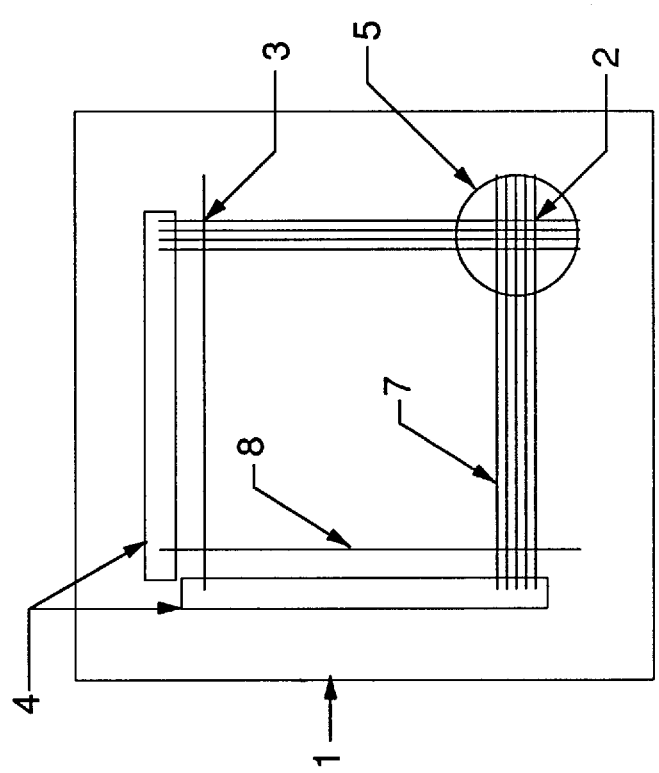
FIG. 1 is a diagrammatic view showing the basic layout and some components of the miniature high resolution viewscreen chip, in accordance with the present invention.

Reference is first made to FIG. 1 which illustrates the basic layout of the apparatus in accordance with the invention. The monolithic die 1, is shown to consist of an array of heating elements or resistors 2. These resistors are connected to both isolated electrically conductive lines 7 & 8 at nodes 3, and are matrix addressed by means of shift registers and drivers 4. The shift registers and drivers do not have to be mounted on the monolithic chip as they can be externally attached to conserve size. The entire surface of the chip is coated with a thermochromic die or liquid crystal highly sensitive to temperature changes above a specific temperature. The resistor elements heat up when addressed and the thermochromic coating would change color from opaque to colorless instantly, upon reaching and exceeding a specific temperature which is higher than ambient. Upon rapid cooling the coating will revert to its original color instantly, although slower cooling rates may cause the die coating to experience shades of grey scale color changes before reverting to its original color. Thermochromic materials change color instantly at a fixed predetermined temperature, and will remain so above this temperature. The thermochromic die's transition from opaque to colorless as its temperature is increased can also occur in a reverse order, from colorless to opaque as its temperature is increased, for all cited embodiments of the invention. Having a high density of coated matrixed resistor elements would, in effect, create a high resolution monochrome grey scale or color display. By rapidly changing each display or "frame" it is possible to produce a moving display. This, however would require many frames per second to accomplish the effect of continuous motion successfully without any flickering effect.

Figure 2:
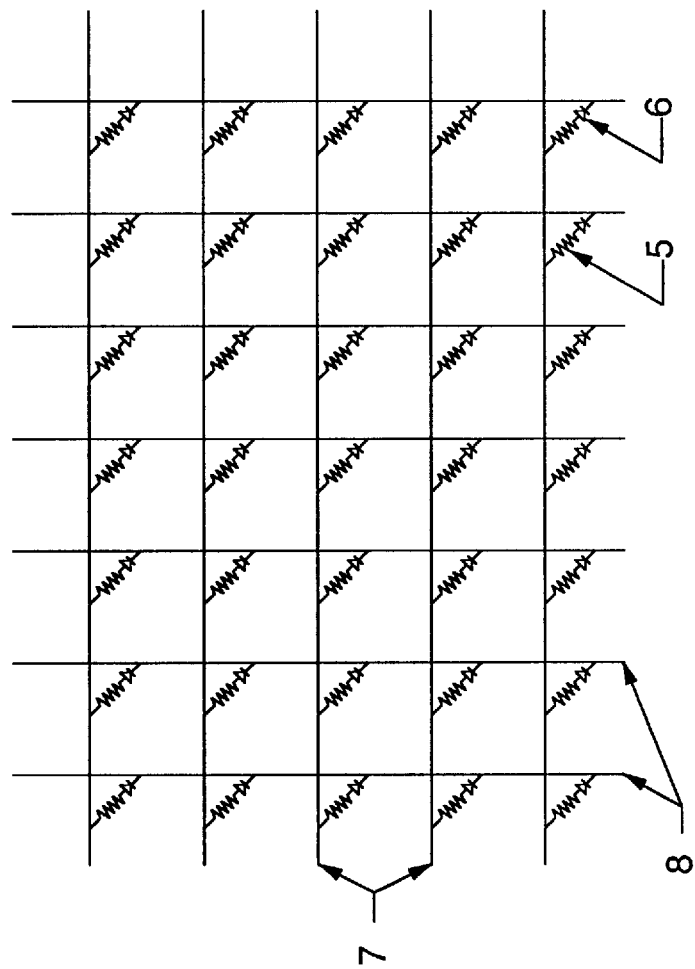
FIG. 2 is an enlarged detailed illustration from FIG. 1 of heating elements at each addressed node in a matrix array, in accordance with the present invention.

Referring now to FIG. 2, which is an enlarged schematic detail 5 of FIG. 1 illustrating a typical portion of the matrix addressing means for heating selected heating elements, in the display device of the invention. It comprises a horizontal array of address lines 7 and a vertical array of address lines 8 in separate insulated layers. At each node or intersection, lines 7 & 8 are connected together via a resistive element 5 as the heat source, which quickly increases in temperature upon the application of a current flow through this element. In a further embodiment of the invention, a diode 6 is introduced at each node in series with each heating element to regulate the current flow path, and also eliminating secondary current flows through elements in the immediate vicinity of addressed elements. By connecting lines 7 & 8 to shift registers and drivers, it is possible to address each node or pixel in the matrix one at a time, where heating elements exist, producing any desired display on the display surface above these elements.

Figure 3:
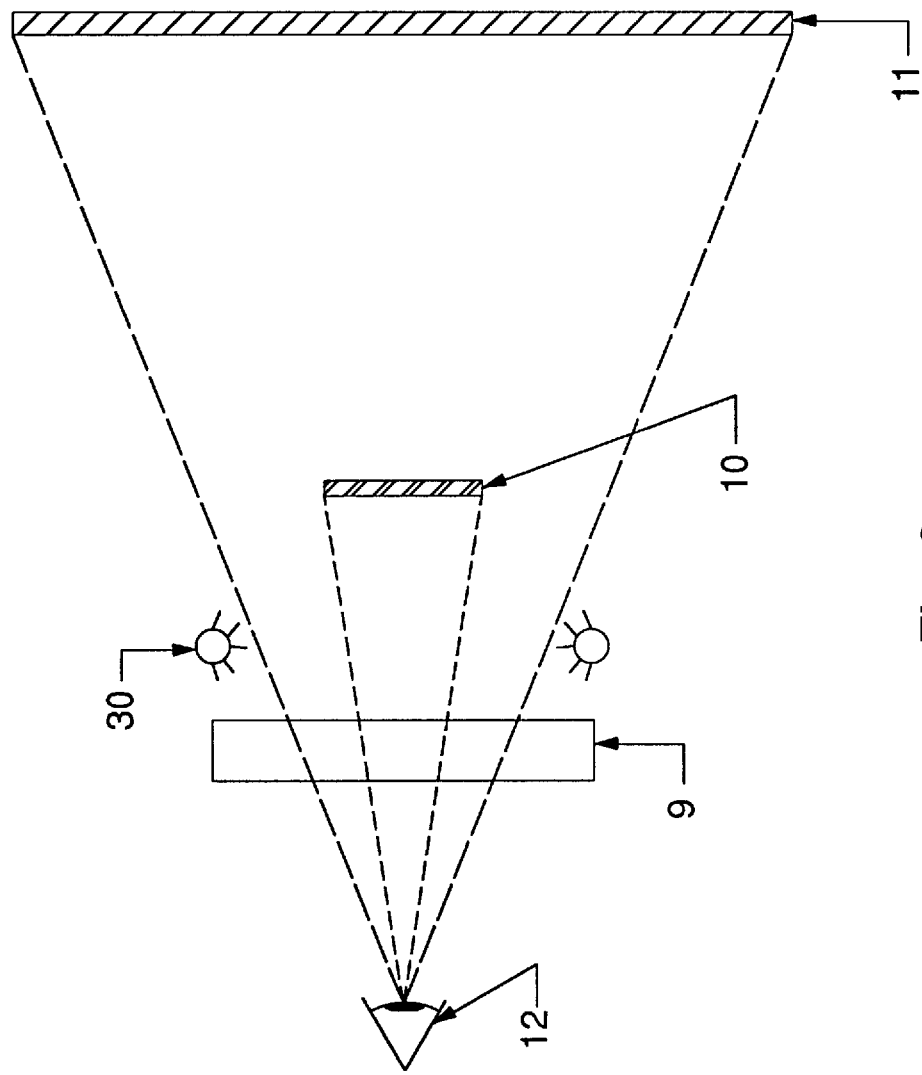
FIG. 3 represents one embodiment of a front lit magnification assembly in accordance with the present invention.

FIG. 3 provides a layout for one particular embodiment of the invention whereby the illumination source and magnification means lie between the observer and the chip. A lens system 9 is implemented to magnify the image of the monolithic chip 10, thus creating a larger imaginary image 11 to the observer 12. A low powered light source 30 is required to illuminate the display and by using a sequential color lighting technique, it is possible to obtain a color display from monochrome. This method employs three primary colored LEDs or other light sources that alternately change the color of each frame. By having three times as many of these color enhanced frames in a single monochrome frame period, a colored display is produced. In another embodiment of the invention similar to that of FIG. 3, the display surface can be produced large enough and of high resolution to be viewed without magnification means.

Figure 4B:
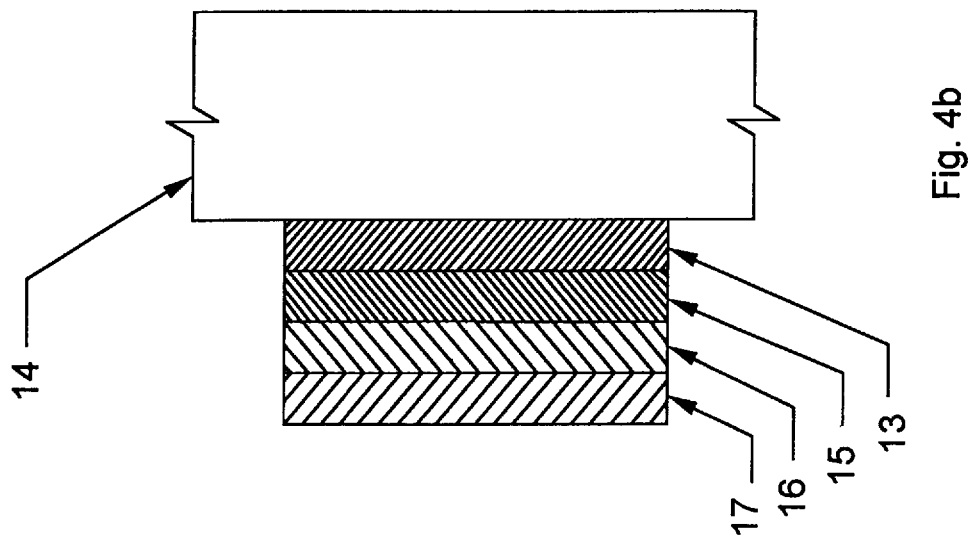
FIG. 4b is an enlarged illustration of an individual heating element in another embodiment featuring a supplementary heat storage element, in accordance with the present invention.
Figure 4A:
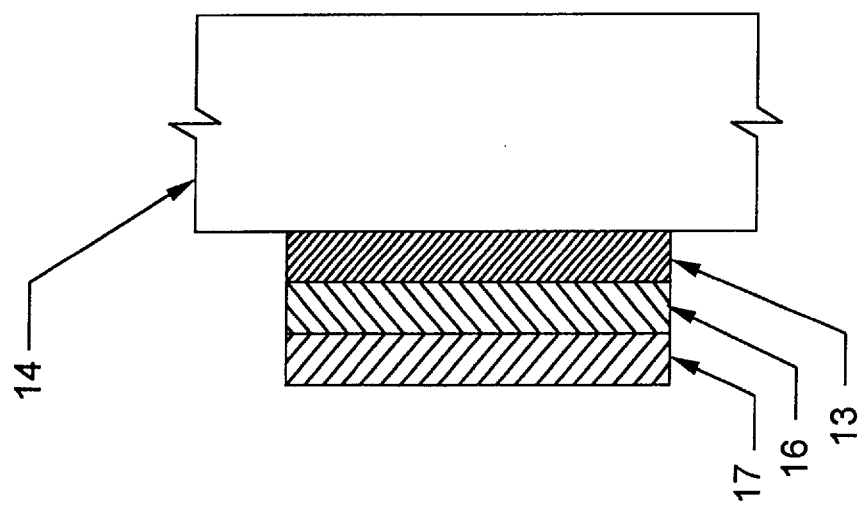
FIG. 4a is an enlarged illustration of an individual heating element in one embodiment with residing layers deposited above it, in accordance with the present invention.

An enlarged representation of an individual heating element is provided in FIG. 4a. All heating elements 13 are deposited onto a base substrate 14 in a matrix array. A colored pad layer 16 is deposited above each heating element forming each pixel in the display. The thermochromic die coating 17 is deposited over each colored pad layer which is the opaque means for concealing each pixel. An array of such color coated elements can used in the apparatus of FIG. 2, to provide another embodiment of the invention eliminating the need for sequential lighting, whereby the base substrate 14 is non-transparent. Thermochromic dies have the property of changing color when the temperature of the surface beneath them is brought above a specific temperature by increasing it. Upon addressing heating elements in the array with a current, the thermochromic coating turns transparent exposing color pads beneath, as heat necessary to perform this transition is applied. The heating elements and their surrounding areas have a specific thermal mass which allows the elements to maintain a higher temperature for one frame period of the displayed image, whereby the thermal mass acts as a memory for the frame period maintaining the die's transparent or opaque state. With groups of red, green, and blue, or other combinations of colored pads comprising one pixel, a full color display can be generated from light reflected off a combination of exposed colored pads for each pixel, as is known in the art. Should there be the need to apply heat for extended periods, a supplementary heat storage element can be introduced in another embodiment as illustrated in FIG. 4b. Deposited onto each heating element 13 is a supplementary heat storage element 15 which retains heat supplied by the heating element throughout the entire duration of one frame period, or a portion thereof. Heat is slowly dissipated through the supplementary heat storage element above which lies a color pad 16 which provides a means for producing a color display as further illustrated in FIG. 6. The thermochromic die coating 17 above the color pad is the opaque means of concealing each pixel. The supplementary heat storage element also serves to allow for rapid addressing of other elements within the matrix for the same frame period, as a reduced heating time per pixel is required. The thermal mass in this particular embodiment is the supplementary heat storage element, heating element, die coatings and other components in the immediate vicinity of each pixel that are responsible for heat transfer and color changes. The supplementary heat storage element functions as a means to protect the heating elements and die coating from excessive exposures to high temperatures, and also provides a heat memory effect significantly reducing power requirements.

Figure 5A:
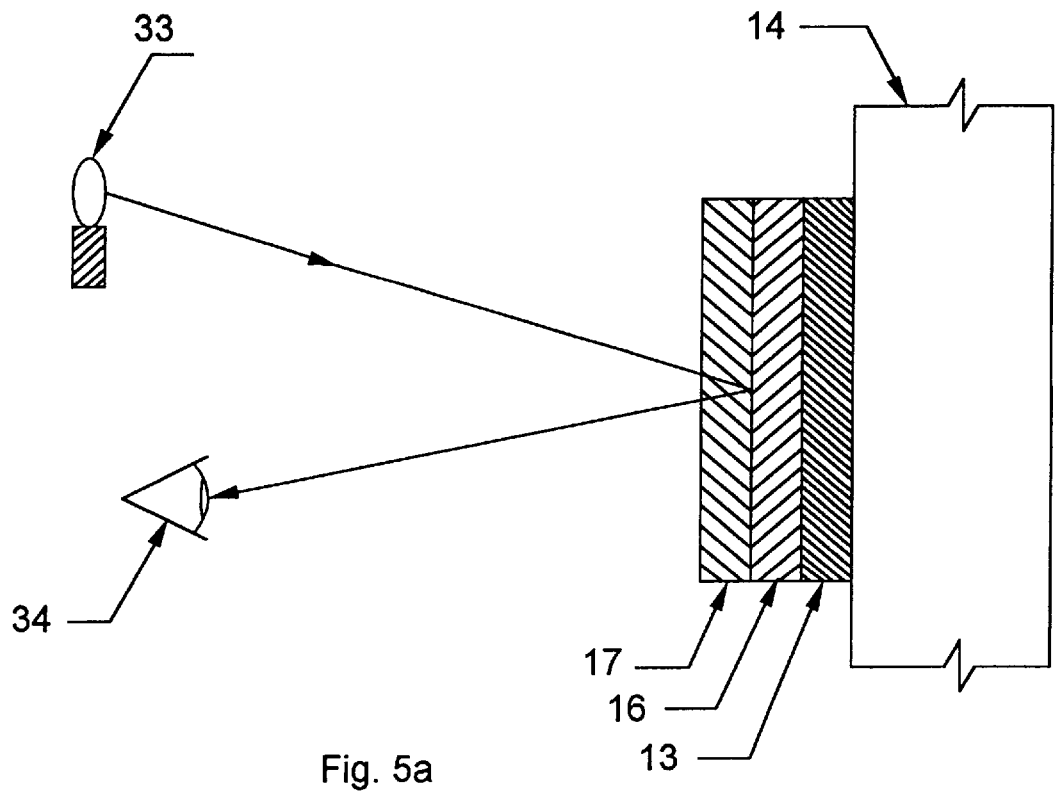
FIG. 5a illustrates one embodiment of a pixel in the device reflecting colors off reflective pads when the die coating turns transparent, in accordance with the present invention.
Figure 5B:
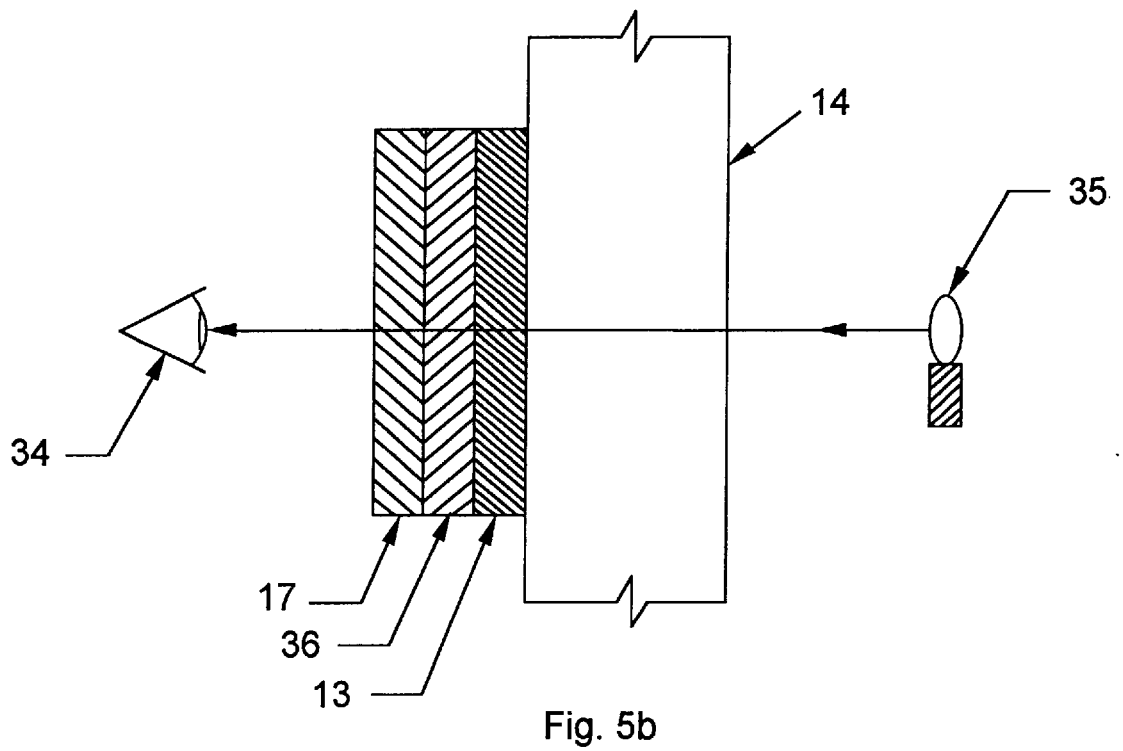
FIG. 5b illustrates another embodiment of the device featuring back lighting and color filters of an individual pixel, in accordance with the present invention.

The illustration of FIG. 5a shows a detail of one pixel of the invention in a reflective display application. Light rays generated from a source 33 pass through selected thermochromic die layers 17 and are reflected off colored pads 16, as seen by the observer at 34. The heating elements 13 mounted on a non-transparent base substrate 14 are selectively addressed in the matrix array, and heat up when a current flows through them bringing the thermochromic die to a higher temperature. Upon reaching a specific temperature which is higher than ambient, the thermochromic die changes from opaque to colorless revealing the colored pads, off which light is reflected to the observer. Pixels that have not been addressed reflect light off the die coating's opaque color or absorb this light. In another embodiment of the invention as illustrated in FIG. 5b, the base substrate 14 is transparent to provide a means for a back lit version or projected version of the device. Light rays from a source 35 pass through the base substrate 14, the heating elements 13, and colored filters 36 which are deposited on the heating elements. The thermochromic die coating 17 remains opaque until the heating elements directly beneath are selectively addressed and heated, turning the die transparent for one frame period or a portion of which, allowing light to pass through the filters and heating elements for addressed pixels only. Pixels that have not been addressed prevent light from passing through the device.

In referring now to FIG. 6, another embodiment is illustrated which provides a back lit version of a projection type display, in accordance with FIG. 5b of the present invention. Light from source 18 provides rays that pass through the transparent base substrate 19 onto which very small or transparent heating elements 20 are deposited. In this particular embodiment, the colored filters 21 are deposited over the heating elements. Thermochromic die layers 22 are deposited over each color filter which allow light to pass through them only when heated by the element beneath. By addressing heating elements in the array, the corresponding thermochromic die coatings directly above these elements turn transparent to allow light to travel through them and also the filter beneath, thus projecting a color display onto a screen 23, with the aid of optics 24 to focus or enlarge the image. Pixels that have not been addressed prevent light from passing through the device.

Figure 7:
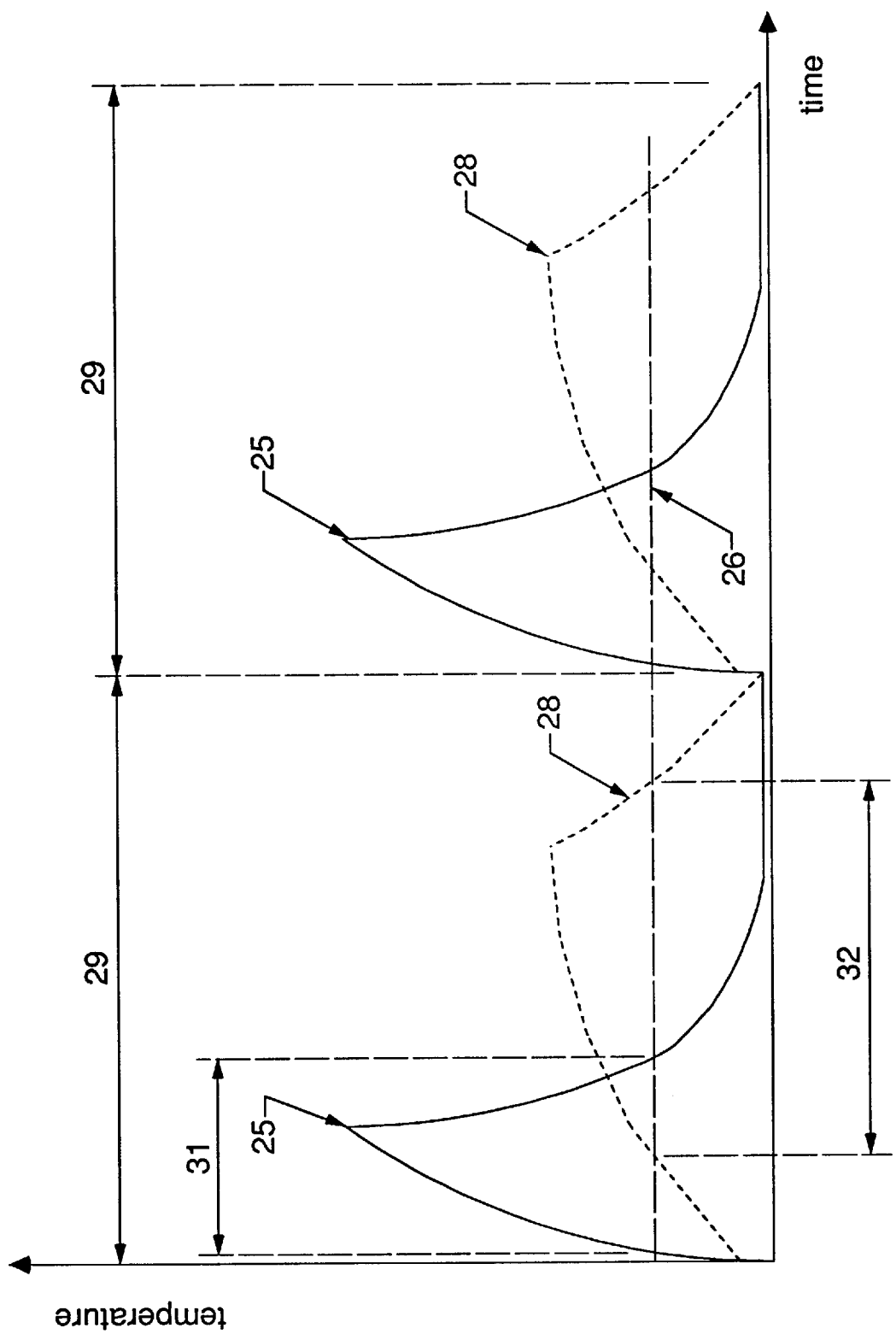
FIG. 7 is a graphical illustration of the heat memory effect provided by the thermal mass deposited over each heating element, in accordance with the present invention.

The supplementary heat storage element surrounding the heating elements provides a means to enable the heat supplied by these heating elements to be stored and slowly dissipated within one frame period, thus keeping those pixels active for that entire frame period or a portion of which, and also allowing for rapid addressing of other elements within the matrix during the same frame period. The supplementary heat storage element also functions as a means to protect the heating elements and die coating from excessive exposures to high temperatures, and also provides a heat memory effect significantly reducing power requirements. In the graphical illustration of FIG. 7, the curves represented by the numeral 25 show the temperature of each heating element as the same current pulse is applied for a portion of two consecutive frames, without the supplementary heat storage element, whereby each frame is represented by the numeral 29. High temperatures are rapidly achieved with rapid cooling thus providing a very short duration in the "transparent" temperature zone of the thermochromic die. This transparent temperature zone is represented by horizontal line 26 above which the die coating rapidly transforms from opaque to transparent. The curves represented by the numeral 28 illustrate the temperature changes in a single frame using a supplementary heat storage element directly above each heating element, for the same current pulse as 25. For a single pulse of current applied to any heating element, the temperature stays above the transparent boundary for a duration 31 without the supplementary heat storage element, whereas the temperature stays above this boundary for a duration 32 with the supplementary heat storage element, during a single frame period 29. The duration 31 is considerably less than 32 demonstrating the significant importance of the supplementary heat storage element, particularly useful in applications demanding extended heating periods during a frame and also enhanced grey scale effects due to longer cooling periods. Application of the supplementary heat storage element protects the die coating and surrounding components from high temperature surges, also providing a more efficient means whereby a shorter heating period is required, enabling addressing of considerably more nodes in the array during one frame period.

Figure 8:
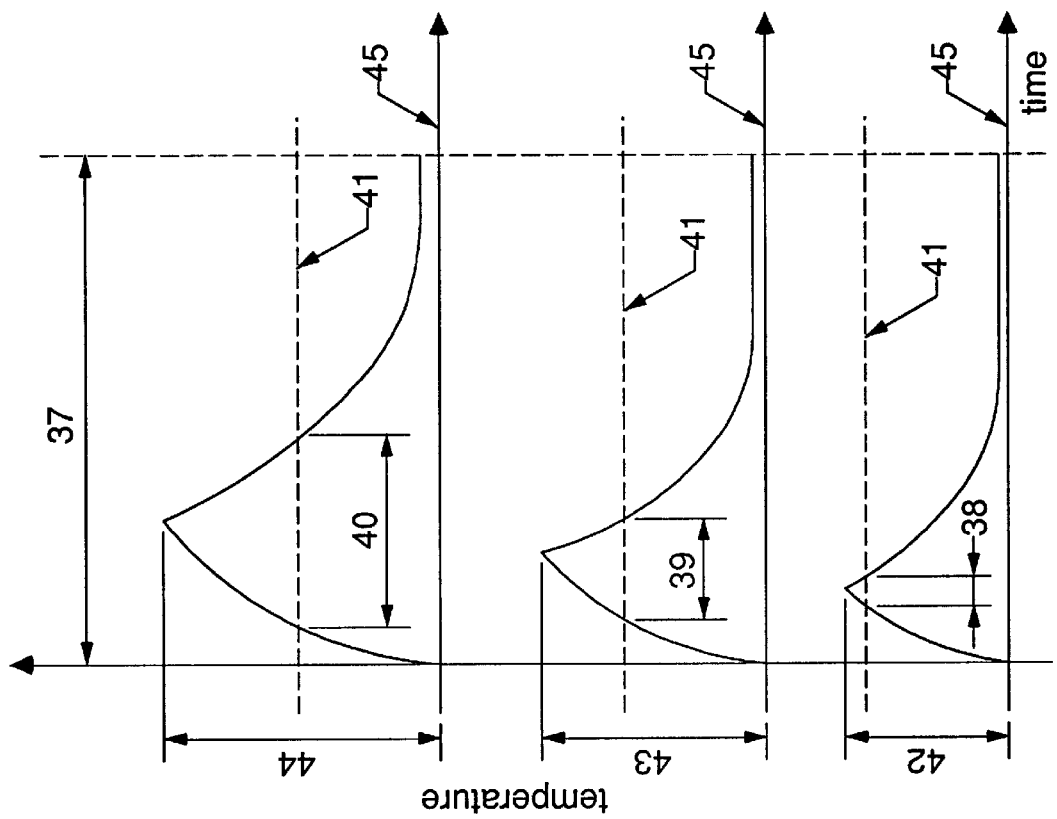
FIG. 8 is a graphical representation of the effects of variable heating to provide grey scale effects, in accordance with the present invention.

Grey scale effects can be achieved by varying the duration of heating and exposure to a color pad or filter for a single frame as illustrated in FIG. 8. When a single heating element is heated for a short duration, the temperature rises from ambient 45 to an amount 42 which is higher than that specific temperature 41 above which the thermochromic die changes from opaque to colorless. The amount of time the die remains in its transparent or transformed state is represented by the numeral 38 throughout the duration of one frame period 37. The amount of time the observer sees the colored pads or filters is very small for a single frame period, hence the shade of that particular color would be light. Increasing the time the same element is heated produces a rise in temperature by 43 above ambient 45, whereby 43 is greater than 42. The amount of time the die remains in its transparent or transformed state is represented by the numeral 39 for one frame period 37, whereby 39 is greater than 38. The observer sees the colored pads or filters longer in a single frame, hence the shade of that particular color would be darker. By further increasing the heat applied to the same pixel produces a rise in temperature by 44 above ambient 45, whereby 44 is much greater than 42. The amount of time the die remains in its transparent or transformed state is represented by the numeral 40 for one frame period 37, whereby 40 is much greater than 38. This longest duration of color change and exposure produces the darkest shade for that frame.

It is also understood that the following claims are intended to cover all of the general and specific features of the invention herein described, and all statements of the scope of the invention which, as a matter of language, might be said to fall therebetween.

I claim:

1. A monolithic, high density, high resolution, visual display chip comprising:

a layer of thermally sensitive material on said display chip which changes color due to a change in temperature;

said thermally sensitive material comprising a thermochromic material layer which changes color with a change in temperature;

wherein a first color changes to transparent when said material is heated from a lower temperature to a higher temperature, the transparent state maintained as long as the higher temperature is applied, said transparent state changes to the first color when said material is cooled from the higher temperature to the lower temperature;

an array of heating elements positioned underneath said thermally sensitive layer forms a matrix array of pixels, individual heating elements being located at pixel locations at the intersection of a plurality of electrically conductive row lines and column lines;

said heating elements having a specific thermal mass which allows the elements to maintain said higher temperature for one frame period of an image, wherein the thermal mass acts as a memory for the frame period or a portion thereof maintaining the transparent or opaque state;

means for establishing a current in selected ones of said thermal heating elements for raising the temperature level and altering the light reflecting properties of those portions of thermally sensitive materials which are in close proximity to said heating elements.

2. A device as claimed in claim 1 such that it changes from transparent to opaque when said material is heated from the lower temperature to the higher temperature, the opaque state maintained as long as the higher temperature is applied, said opaque state changes to transparent when said material is cooled from the higher temperature to the lower temperature.

3. A device as claimed in claim 1 such that it allows light to pass through said thermal mass and groups of primary colored filters to provide a projected color display, when the first color of thermally sensitive material changes to transparent when said material is heated from the lower temperature to the higher temperature.

4. A device as claimed in claim 1 such that light is reflected off colored pads when the first color of thermally sensitive material changes to transparent, when said material is heated from the lower temperature to the higher temperature, providing a color display magnified through a lens system.

5. A device as claimed in claim 1 which uses a supplementary heat storage element means to protect the thermal mass elements from excessive exposures to high temperatures and provide a heat memory effect.

6. A device as claimed in claim 1 which uses a diode in series with each heating element to regulate the current flow path in directions to heat addressed pixels only.

* * * * *